United States Patent [19]

Duenke

[11] 4,320,432

[45] Mar. 16, 1982

[54] HIGH VOLTAGE TRANSFORMER BUSHING FUSE AND ARRESTER ARRANGEMENT

[75] Inventor: Clarence G. Duenke, San Angelo, Tex.

[73] Assignee: San Angelo Electric Service Company, San Angelo, Tex.

[21] Appl. No.: 99,615

[22] Filed: Dec. 3, 1979

[51] Int. Cl.[3] .................... H02H 7/04

[52] U.S. Cl. .................... 361/39; 361/132; 361/41; 361/38; 174/18; 337/202

[58] Field of Search .................... 361/39, 40, 37, 38, 361/41, 35, 104, 132; 337/202, 9, 12, 171, 172, 178, 187, 237, 241, 231, 234, 252, 253, 254; 174/17, 18, 167, 152, 153, 145

[56] References Cited

U.S. PATENT DOCUMENTS

| | | | |
|---|---|---|---|
| 2,053,916 | 9/1936 | Merkle | 361/41 |
| 2,055,346 | 9/1936 | Foster | 361/41 |
| 2,158,638 | 5/1939 | Schultz | 337/202 |
| 2,166,782 | 7/1939 | Lemmon | 337/202 |
| 2,453,719 | 11/1948 | McFarlin | 361/40 |
| 2,491,338 | 12/1949 | Smith, Jr. | 361/38 |
| 2,668,210 | 2/1954 | Petersen | 361/39 X |
| 2,704,795 | 3/1955 | Miller | 337/202 |
| 3,073,993 | 1/1963 | Leonard et al. | 361/39 |
| 3,249,815 | 5/1966 | Henry | 361/40 |
| 3,628,269 | 12/1971 | Stroup | 361/41 X |

*Primary Examiner*—Patrick R. Salce

*Attorney, Agent, or Firm*—Hubbard, Thurman, Turner, Tucker & Glaser

[57] ABSTRACT

A high voltage transformer bushing having an inner conductor extending from a lower end to a point spaced from an upper end and having a side terminal at that point connected to a fuse link which is in turn connected to a high voltage line connector supported on the upper end of the bushing. A lightning arrester supported by and grounded to the transformer casing has an upper end spaced from the high voltage line connector to provide a spark gap.

7 Claims, 2 Drawing Figures

HIGH VOLTAGE TRANSFORMER BUSHING FUSE AND ARRESTER ARRANGEMENT

BACKGROUND OF THE INVENTION

The present invention relates to transformer high voltage bushings and more particularly to an improved arrangement of a bushing, a fuse link, and a lightning arrester.

References believed to be relevent to the present invention include U.S. Pat. No. 2,453,719 issued to McFarlin in 1948 and U.S. Pat. No. 3,249,815 issued to Henry in 1966. Each of these patents generally illustrates the usefulness of lightning arresters with power distribution transformers. The Henry patent further shows the use of an explosive disconnector with a lightning arrester.

As demonstrated by the above-referenced patents, it is generally well known that the high voltage line inputs to power distribution transformers must be protected in several ways. Lightning arresters, otherwise known as excessive potential discharge devices, are normally positioned between the high tension line and a ground connection at the input to such transformers. As shown in the Henry patent, such protectors may be wired directly across the high tension line to ground circuit or may employ external spark gaps in addition to the normal internal spark gaps. As noted in the Henry patent, it is not at all uncommon for the lightning protectors themselves to fail and draw excessive currents from the high tension line with possible disruption of service resulting. The explosive disconnectors provided in the Henry arrangements are intended to separate the lightning arrester from the line upon such an occurrence.

It is additionally desirable, in most installations, to provide a fuse of some type between the high tension line and the input connection to the transformer windings. Neither of the above-referenced patents specifically show such fuse link. Quite often such fuse link comprises merely a reduced diameter length of wire, or weak link, connected to the end of the high tension bushing within the transformer casing. It is difficult to detect the fact that such a fuse link has separated and it is even more difficult to replace such a link.

Since the connection to the high tension side of the transformer is normally made at the upper end of the high tension bushing, any external fuse link must normally be connected between the bushing and the high tension line. To provide appropriate mounting locations for such an external fuse link, a stand-off insulator is often provided as an additional element attached to the top of a lightning arrester carried on a transformer case. Such a stand-off insulator is illustrated in FIGS. 6, 8 and 9 of the above-referenced McFarlin patent. The high tension line is normally connected to the top of the stand-off insulator and an external fuse link is supported between the stand-off insulator and the normal transformer high tension bushing. As a result, the stand-off bushing, high tension line connection and one end of the fuse, are supported by the lightning arrester.

As noted above, it is not unusual for lightning arresters to fail. In addition, it is not unusual upon such failure for the lightning arrester to physically disintegrate or at least break into several pieces. When the high tension line is supported by the lightning arrester, such mechanical breakage of the lightning arrester can disrupt service in several ways. Primarily, the broken pieces of the arrester which are then hanging from the high tension line tend to pull the line downwards and against the grounded transformer casing thereby shorting out the high tension line. If the fuse is positioned between the stand-off insulator and high tension bushing, such a short circuit is not interrupted by the fuse link. Even if a short to ground does not occur, damage or breaking of the fuse link can occur which will interrupt service to the transformer.

Thus, it is seen that in many circumstances the line protecting lightning arrester actually results in the precise disruption of service which it is supposed to avoid.

SUMMARY OF THE INVENTION

Accordingly, an object of the present invention is to provide an improved high tension input arrangement to a power distribution transformer.

Another object of the present invention is to provide an improved transformer high tension input which prevents disruption of service upon physical, as well as electrical, failure of a lightning arrester.

Another object of the present invention is to provide a transformer high tension input having a fuse link between the high tension line and high tension transformer winding which is external to the transformer case and may be visually inspected.

These and other objects of the present invention are achieved by providing a transformer high tension input arrangement comprising an improved bushing having an internal conductor extending from a lower end thereof to a point spaced from an upper end, a side terminal connected to the upper end of the conductor, a high tension line connection on the upper end of the bushing, an external fuse link between the side terminal and high tension line connector and, preferably, a separate lightning arrester supported by the transformer case having one end spaced from the high tension line connector to provide an external spark gap.

BRIEF DESCRIPTION OF THE DRAWINGS

The present invention may be better understood by reading the following detailed description of the preferred embodiments with reference to the accompanying drawings wherein.

DESCRIPTION OF THE PREFERRED EMBODIMENTS

Figure 1:
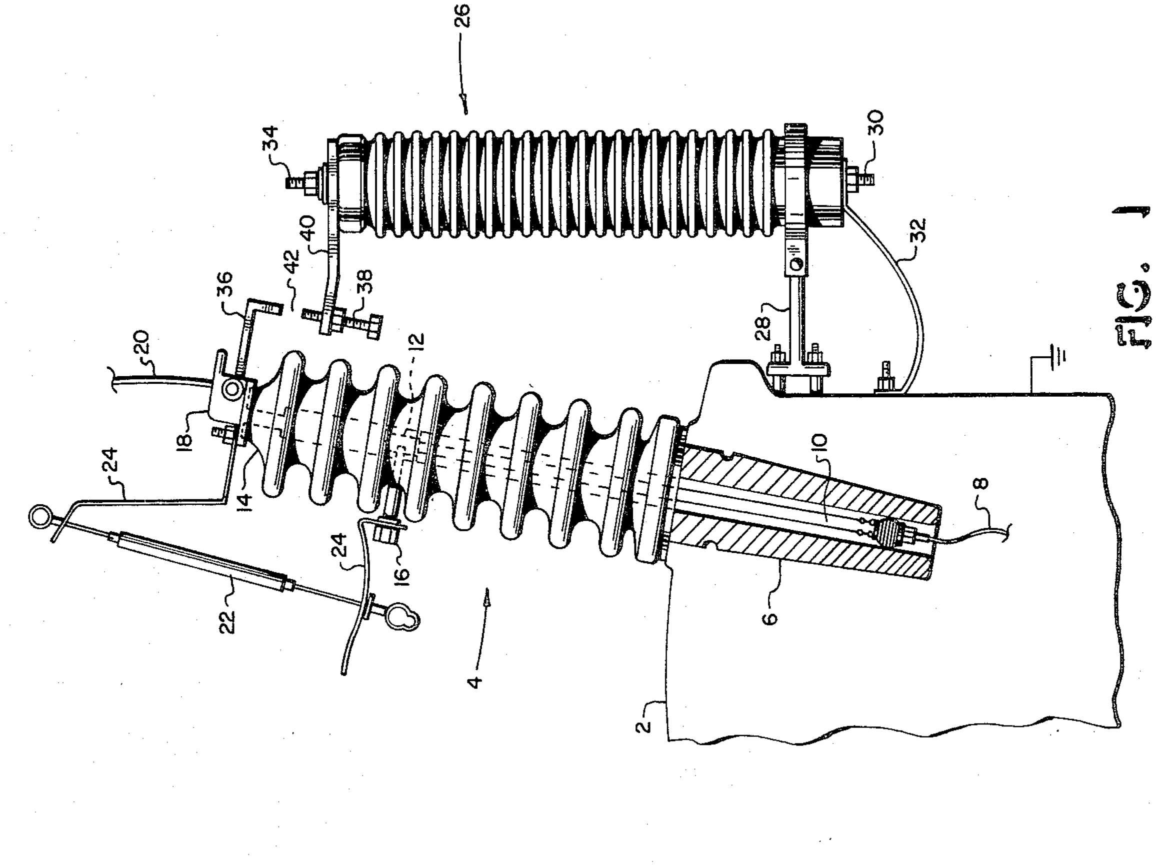
FIG. 1 is an elevational view, partly in cross section, of an improved transformer bushing, fuse and a lightning arrester arrangement according to the present invention; and, FIG. 2 is an elevational view of a second arrangement of the high tension bushing, fuse and lightning arrester according to the present invention.

With reference now to FIG. 1, there is illustrated an improved transformer high tension bushing, fuse and lightning arrester arrangement positioned on a conventional transformer casing 2. The steel casing 2 is normally grounded and may conveniently be used as a source of a ground connection for lightning protection. An improved high tension bushing 4 is provided having a lower end 6 within the transformer casing 2 with a majority of bushing 4 positioned above and outside of casing 2. A lead 8 from the high tension winding of the transformer is connected at end 6 of bushing 4 to the lower end of a conductor 10 passing through bushing 4. Conductor 10 terminates at an upper end 12 spaced below the top 14 of bushing 4. A side terminal 16 is provided on the outer surface of bushing 4 and extends through the wall of bushing 4 to contact the upper end 12 of the conductor 10. A high tension line connector 18 is carried on the upper end 14 of bushing 4. A section of conductor 20 is shown running from connector 18 to the high tension line. An external fuse link 22 completes the circuit between high tension line 20 and the transformer winding lead 8. Fuse link 22 is preferably connected to the terminal 16 and connector 18 by means of a pair of pretensioned spring arms 24. The arms 24 place the fuse link 22 under tension so that upon melting of fuse link 22, the remaining portions of fuse link will be rapidly separated to reduce the possibility of arcing and to clearly indicate that the fuse has blown.

A lightning arrester 26 is supported by a bracket 28 bolted to the side of casing 2. Arrester 26 may be any conventional form of lightning arrester. A lower terminal 30 is grounded by means of a strap 32 which is also bolted to the casing 2. An upper terminal 34 of arrester 26 is spaced from the high tension connector 18 to form an external spark gap in a conventional manner. In this embodiment, an arm 36 extends from high tension connector 18 and is positioned above an adjustable bolt 38 threaded into an arm 40 connected to terminal 34 of the arrester. The adjustment bolt 38 allows precise adjustment of the spark gap 42 according to the desired arcing potential.

It can be seen that once the high tension input to the transformer is provided as in FIG. 1, both lightning arrester protection and external fusing of the transformer input are provided without the disadvantages of the prior known arrangements. In particular, upon a total failure of arrester 26, any separated parts of the arrester will simply fall away and cannot short out the high tension line. If a transformer failure should occur, resulting in excess current, the fuse link 22 will separate, opening the high tension connection to the transformer. The separation of fuse link 22 will be quite apparent to any inspector since the arms 24 will provide a wide separation between the remaining portions of the fuse. With either type of failure, the high tension lead 20 remains bolted to the high tension connector 18 which is firmly supported on the bushing 4. Thus, while the present arrangement provides the desirable external fusing of the transformer input, the disadvantages of supporting the high tension lead mechanically from the lightning arrester are avoided.

Figure 2:
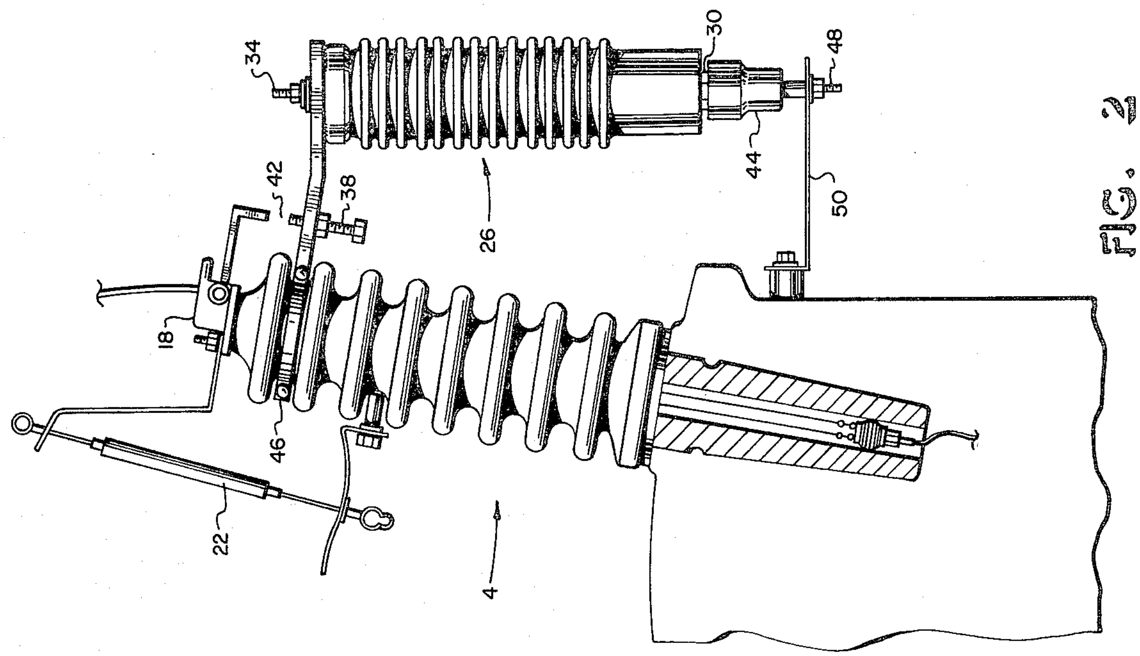

With reference now to FIG. 2, a slightly modified arrangement of the present invention is illustrated. Parts which are common to both FIGS. 1 and 2 carry the same designation numbers in both figures. The bushing 4, fuse link 22 and high tension terminal 18 arrangements are identical with those shown in FIG. 1. In addition, the lightning arrester 26 itself may be the same as shown in FIG. 1. However, the arrangement for supporting lightning arrester 26 differs and additionally, an explosive disconnector 44 may be employed. A clamp 46 is provided on bushing 4 between its upper end 14 and the upper end 12 of conductor 10. This clamp 46 extends outwardly from bushing 4 and is connected mechanically and electrically to the upper terminal 34 of arrester 26. The adjusting bolt 38 is threaded into a portion of clamp 46 for providing the spark gap 42. The explosive disconnector 44 is, in this arrangement, threaded onto the lower terminal 30 of the arrester 26 and has an external terminal 48 connected to the transformer casing 2 by means of a flexible strap 50. Explosive disconnector 44 is a conventional component such as that used in the above-referenced Henry patent. The strap 50 is preferably a pretensioned spring arm such as the arms 24 and operates upon separation of disconnector 44 to pull the remaining sections of the disconnector apart to avoid further arcing.

In this FIG. 2 embodiment, the lightning arrester is totally supported from the main high tension bushing on the transformer. Upon mechanical failure of the arrester 26, the lower portions of the arrester will fall away from the bushing 4 without providing a path for short circuiting the high tension line. It can be seen that even if the explosive disconnector 44 does not function, the pretensioned arm 50 would tend to pull the lower portions of the arrester 26 away from the upper portions thereby preventing continued arcing. The weight of portions of arrester 26 would aid this separation function. Even if the lower portions of the arrester are then allowed to fall against the transformer casing 2, no short circuit will result since there is no connection to the high tension line. Thus, in this arrangement, disruption of electrical service caused by failure of the protective lightning arrester is again avoided.

While the present invention has been illustrated and described with reference to particular apparatus, it is apparent that various modifications and changed can be made within the scope of the present invention as defined by the appended claims.

I claim:

1. A transformer high voltage terminal comprising:

a generally cylindrical insulating bushing having a first end for engagement with a transformer housing, an axial passageway extending from said first end to a point spaced from a second end, and a radial passageway extending from an outer surface of said bushing to said axial passageway at said point;

an electrical conductor extending from said bushing first end through said axial and radial passageways;

a high tension line connector carried on said second end of said bushing;

a fuse link connected between said electrical conductor at said radial passageway and said high tension line connector;

said fuse link being mounted on spaced apart pretensioned spring arms, one arm being mounted on said high tension line connector and the other arm being mounted on said electrical conductor;

a spark gap arm mounted on said high tension line connector; and a lightning arrester having a first end connected to said housing and a second end carrying a spark gap terminal spaced from said spark gap arm by a preselected distance.

2. Apparatus according to claim 1 further including a clamp connected to said bushing and to said second end of said lightning arrester to mechanically support said lightning arrester.

3. Apparatus according to claim 1 further including a bracket having a first end connected to said transformer housing and a second end mechanically supporting said lightning arrester.

4. Apparatus according to claim 1 further including an explosive disconnector in series with said lightning arrester between said spark gap terminal and said connection to ground.

5. Apparatus according to claim 4 wherein:

said explosive disconnector is mounted on said first end and is connected to one end of a tensioned spring ground strap, said strap being connected at its opposite end to said housing.

6. Improved transformer construction according to claim 1 further including a clamp connected to said bushing and to said lightning arrester for mechanically supporting said lightning arrester, said clamp including said spark gap terminal formed thereon.

7. Apparatus according to claim 1 wherein:
said spark gap terminal includes a threaded member for adjusting the gap between said spark gap terminal and said spark gap arm by a preselected amount.

* * * * *